(12) United States Patent
Llorente Gonzalez et al.

(10) Patent No.: US 7,901,188 B2
(45) Date of Patent: Mar. 8, 2011

(54) WIND TURBINE BLADE

(75) Inventors: Jose Ignacio Llorente Gonzalez, Pamplona (ES); Sergio Velez Oria, Pamplona (ES)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 830 days.

(21) Appl. No.: 11/547,745

(22) PCT Filed: Mar. 31, 2005

(86) PCT No.: PCT/ES2005/000168
§ 371 (c)(1),
(2), (4) Date: Aug. 16, 2007

(87) PCT Pub. No.: WO2005/100781
PCT Pub. Date: Oct. 27, 2005

(65) Prior Publication Data
US 2008/0145231 A1  Jun. 19, 2008

(30) Foreign Application Priority Data

Apr. 7, 2004 (EP) .................................... 04380080

(51) Int. Cl.
*F03D 1/06* (2006.01)
(52) U.S. Cl. ..................................... 416/228; 416/223 R
(58) Field of Classification Search ................. 416/228, 416/235, 236 R, 241 R, 87, 146 R
See application file for complete search history.

(56) References Cited

U.S. PATENT DOCUMENTS
2003/0138290 A1  7/2003  Wobben

FOREIGN PATENT DOCUMENTS

| DE | 102 35 496 | 2/2004 |
| EP | 0 258 926 | 3/1988 |
| ES | 2 178 903 | 1/2003 |
| JP | 2004-11616 | 1/2004 |

*Primary Examiner* — Edward Look
*Assistant Examiner* — Jesse Prager
(74) *Attorney, Agent, or Firm* — Ladas & Parry LLP

(57) ABSTRACT

A wind turbine blade transversely subdivided into two or more separate modules (1-2) consisting of outer aerodynamic walls or hulls (4) and a longitudinal inner reinforcing structure (3). The modules include coupling means at the ends of the longitudinal reinforcing structure (3), which means consist of lugs (5-7, 6-8) projecting into respective portions with alignable openings (9) for receiving coupling elements.

7 Claims, 7 Drawing Sheets

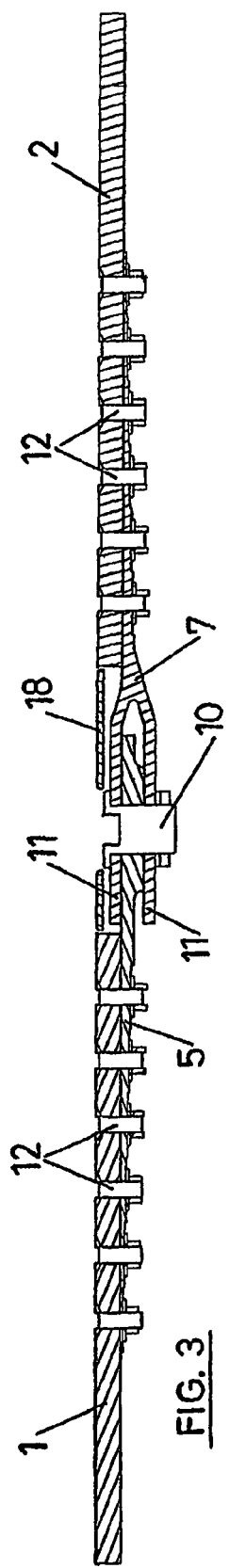
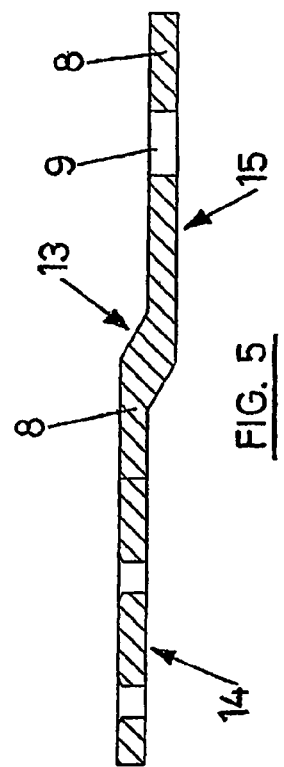
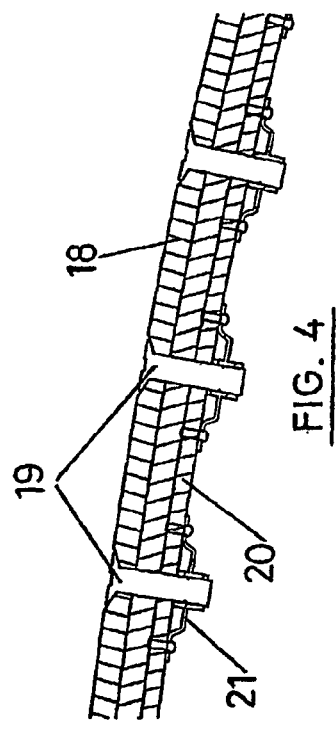
FIG. 3
FIG. 4
FIG. 5

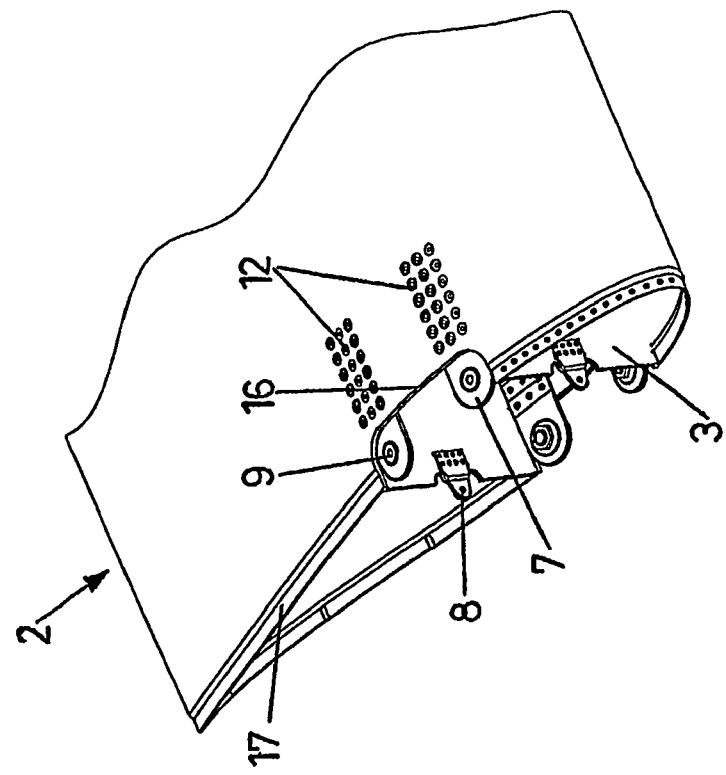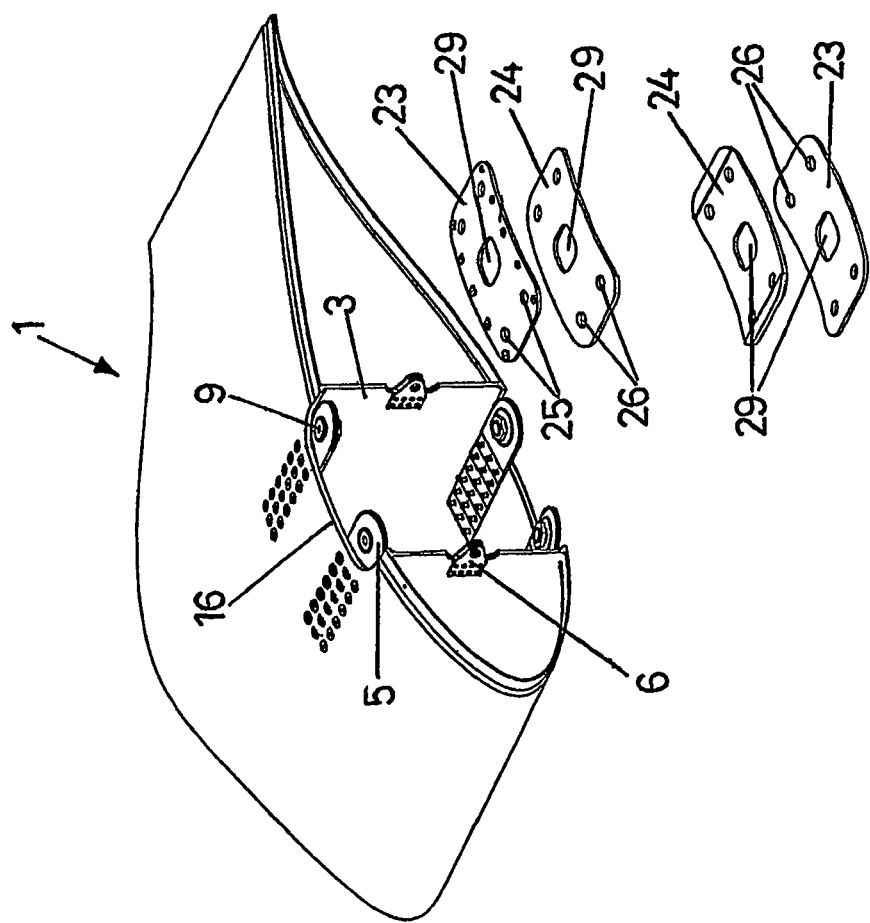
FIG. 6

WIND TURBINE BLADE

The present invention refers to a wind turbine blade, transversely subdivided into two or more independent spans provided with connecting means in the faceable end sections.

Wind turbines are designed to obtain increasingly greater power. Among the components intervening in the wind turbine power are the blades forming the rotor. The aerodynamic features and dimensions of the blades are fundamental for increasing the power of the turbine. For this reason, increasingly longer blades are manufactured.

Since wind turbines are usually assembled in difficult to access places, transporting the blades is usually very problematic, especially due to their length.

To resolve the problem set forth, transversely subdividing the blades into two or more independent spans or modules, which are provided with jointing means in the faceable sections, is already known.

In this sense, European Patent EP 1,244,873 can be cited, which discloses a wind turbine rotor blade transversely subdivided into sections joined to one another by means of a plurality of plates connecting the faceable edges of consecutive sections. The jointing of the plates with the edges of the sections to be connected can be carried out by means of bolts placed on the surfaces of said sections, along their edges. This system has the drawback of the large number of existing connections, taking into account the fact that they must be carried out in the field, with limited means. On the other hand, most of the points of attachment are arranged outside of the resistant inner frame, which reduces the resistance of said points of attachment, requiring for that purpose a large number of points of attachment.

A wind turbine rotor blade subdivided into at least two segments joined to one another by means of expansion screws is known by German patent DE 3,109,566. The placement of these screws is also difficult, taking into account the conditions in which the assembly operations must be carried out.

U.S. Pat. No. 4,389,162 discloses a wind turbine rotor blade transversely subdivided into several sections. The jointing means consists of a longitudinal element with high tensile strength, for example a cable, running inside the different sections of the blade and anchored to anchorings arranged in the end sections. This system has the same aforementioned assembly drawbacks and also requires a special constitution of the different components.

The object of the present invention is a wind turbine blade made up of an internal longitudinal reinforcement structure and of external aerodynamic shells or cases joined to the structure, the blade being transversely subdivided into two or more sections or modules fixed to one another by means of a reduced number of easy to carry out connections, which facilitates assembly of the blades in the field because of the features of the joints and the reduced number thereof, allowing the interchangeability of modules.

Transportation to the wind turbine assembly site is facilitated by means of the subdivision of the blades into modules of a determined length.

On the other hand, assembly times are reduced since the number of joints is reduced and since these are constituted such that they can be easily carried out in the field. All this makes it possible not only to solve logistic problems with the present invention, but also to allow meeting the objective of logistic optimization.

The internal longitudinal reinforcement structure can be made up of a structural box beam and external aerodynamic cases or shells joined to two of the opposing walls of the structural beam, both being made up of resins reinforced with fibers of a different nature. The blade, made up of the beam and shells, is transversely subdivided into modules provided with connecting means on their facing edges.

According to the invention, the connecting means are arranged in coincidence with the end sections of the internal longitudinal reinforcement structure and are constituted of lugs axially projecting from the edges of said end sections in coinciding positions, such that when consecutive modules are coupled, the lugs thereof are abutted or facing one another in order to receive jointing elements.

The lugs are preferably provided with an end hole which, in the event that the lugs are abutted when the modules are coupled, said holes are aligned in each pair of abutted lugs to receive an attachment screw or jointing rivet. When the lugs are facing each other, without abutting, intermediate plates provided with holes which can be aligned with those of said lugs are arranged on each pair of facing lugs for the introduction of attachment screws or jointing rivets.

The modules forming the blade have, starting from the free edge and preferably in the area where the connecting means will be arranged, indentations defining an access opening through which the attachment screws or jointing rivets are arranged and/or handled when two consecutive modules are coupled. This opening can be made in the cases, near the free edge of the modules, to access the assembly of the attaching screws.

The main features of the jointing described is the interchangeability and easy field assembly, qualities which can exist only when there are few points of attachment.

In this sense, the lugs can be arranged parallel to either of the axes of the end sections, in which case the connecting means can be constituted of a maximum of six lugs, fixed in spans in which the internal longitudinal reinforcement structure and the shells or cases coincide and are joined, and in spans of said structure running between the shells or cases. The existence of lugs in each span allows absorbing all the components of the joint loads.

As an alternative, the lugs can be arranged in a position not parallel to either of the axes of the end sections, in which case it could be sufficient to arrange four lugs, by means of which all the components of the joint loads could also be absorbed.

In either case, since the internal longitudinal reinforcement structure is the main element responsible for the structural integrity of the blade, the jointing elements must be arranged such that they provide continuity to the reinforcement structure of each one of the modules to connect.

The jointing between the lugs and the modules can be carried out by means of screws. These joints are carried out in the manufacturing plants, the module therefore being constituted of the blade section and the different assembled lugs. The jointing between both modules would subsequently be carried out in the field by means of the through screws or bolts constituting the jointing elements.

Finally, the aerodynamic surface is closed, between consecutive modules, with a non-structural, or rather a structurally secondary, cuff. The joining of said cuff to the modules is screwed down. To this end, a flat bar containing the coupling nuts is assembled in each one of the modules, starting from the end sections and on their internal surface, in the manufacturing plant. Thus, when the jointing is carried out in the field, the operator will only have to position the cuff and introduce the screws from the outside, without needing to hold the nuts.

The features and advantages of the invention will be better understood with the following description, made in reference to the attached drawings which show a nonlimiting embodiment.

In the drawings:

FIG. 3 shows a cross-sectional view of a joint between consecutive modules, taken along section line III-III of FIG. 2.

FIG. 4 shows a longitudinal sectional view of the cuff closing the aerodynamic surface, taken along section line IV-IV of FIG. 2.

FIG. 5 shows a longitudinal sectional view of one of the lugs forming part of the connecting means of the invention.

FIG. 6 shows a view similar to FIG. 1, showing an embodiment variant.

In wind turbine blades transversely subdivided into modules, the first question posed is how many modules the blade should be divided into, according to different factors, among which the manufacturing means, the transportation possibilities, etc., can be considered. The blades can be subdivided, for example, into three modules, although a subdivision into a larger number of modules of a smaller length, or a smaller number of modules of a longer length, could be decided according to other factors.

Figure 1:
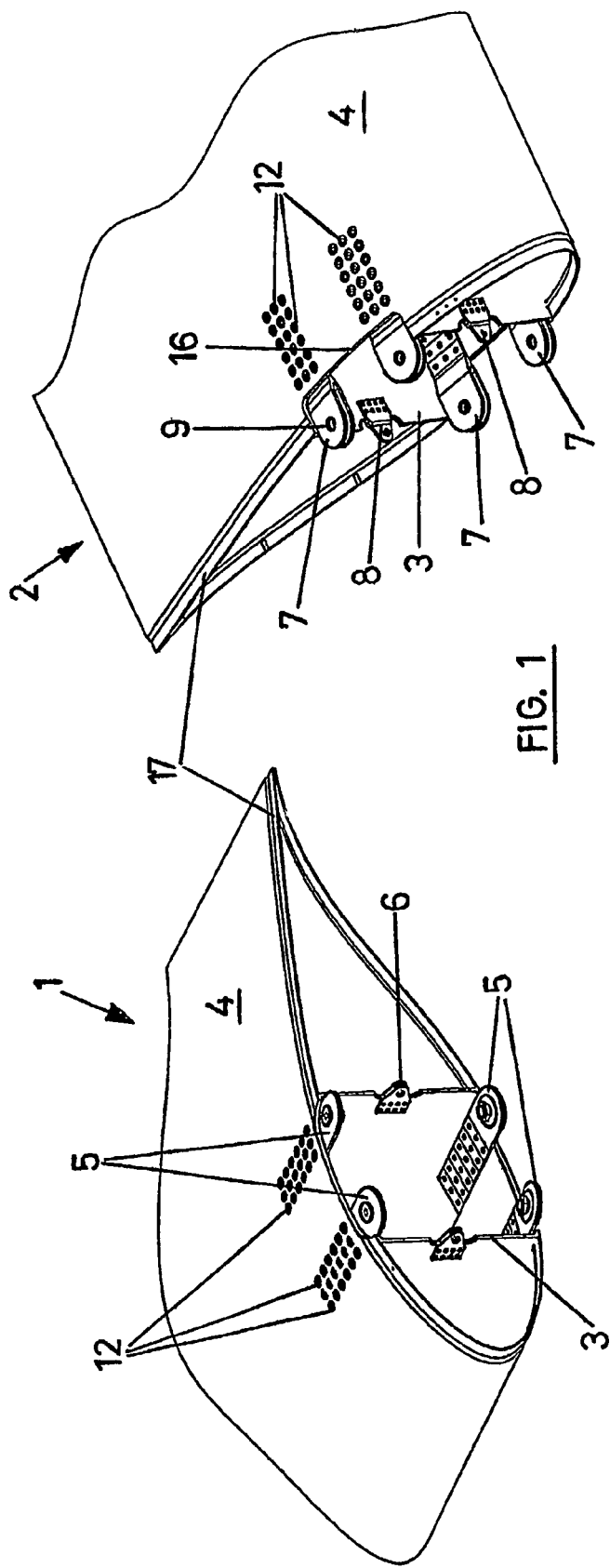
FIG. 1 shows a perspective view of the connectable ends of the modules, provided with connecting means constituted according to the invention.

FIG. 1 shows a perspective view of the faceable end sections of two consecutive modules 1 and 2 of a wind turbine blade. These blades are mainly made up of an internal reinforcement structure, in the form of a structural beam 3 in the example described, and of aerodynamic shells or cases 4 either one being able to be made up of resins reinforced with fibers of a different nature.

The end sections are provided with connecting means constituted of lugs fixed to each span or module 1 and 2 and projecting axially therefrom, indicated with numbers 5 and 6 in module 1 and with numbers 7 and 8 in module 2, all the lugs being arranged in coincidence with the end sections of the structural beam 3, each of the lugs in both modules being arranged in coinciding positions.

In the case shown in FIG. 1, the connecting means are made up of six lugs, four of which, indicated with numbers 5 and 7, are fixed in spans of the structural beam 3 coinciding with the shells or cases 4, two placed on each side following the trajectory of said spans, whereas the other two lugs, indicated with numbers 6 and 8, are fixed on each side in the spans of the structural beam 3 running between opposing walls of the shell or case 4, as an extension of said spans.

All the lugs are provided with a hole 9 in the portion projecting from the edge of the modules. Furthermore, the lugs have such a length that when abutted against one another, the end sections of the modules 1 and 2 partially overlap, such that the holes 9 of abutted lugs are aligned to receive an attachment screw or bolt 10, FIG. 3.

As can be seen in FIG. 3, the lugs 7 split in the end portion into two branches 11 between which the lug 5 of the opposing module 1 is introduced, the holes 9 of the branches being aligned with the hole 9 of the lugs 5 for the passage of the connecting screw or bolt 10.

As can be seen in FIG. 1, the lugs 5 and 7 have an approximately rectangular contour and are abutted at the internal surface of the structural beam, being fixed to the wall of said beam and shells 4 by means of countersunk head screws 12, FIG. 3, to prevent them from projecting from the aerodynamic surface, which fixing is carried out in the factory.

The lugs 6 are flat and double, each one fixed at one of the surfaces of the corresponding walls of the structural beam, also by means of screws. With regard to the lugs 8, as is shown in FIG. 5, which is a longitudinal sectional view of one of these lugs, they are provided with an intermediate transverse bend 13 and are abutted against and fixed to the corresponding wall of the structural beam at span 14, by means of screws, the end span 15 of each pair of lugs abutted against one another running to be introduced between the opposing pair of lugs, the holes 9 of each of the lugs facing one another to introduce the attachment screws or bolts.

Figure 2:
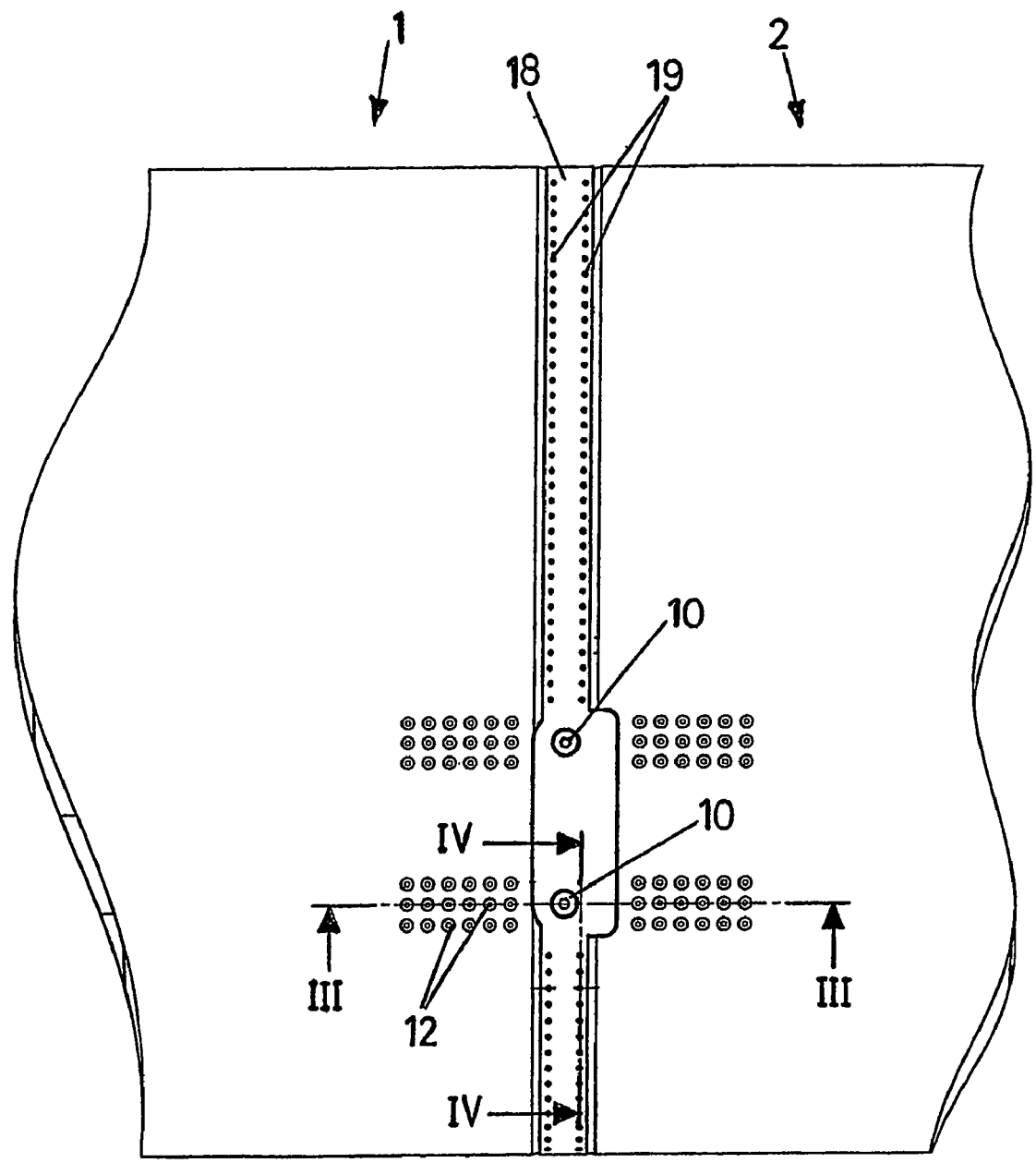
FIG. 2 shows an upper plan view of the modules of FIG. 1, once joined and with the cuff closing the aerodynamic surface thereof.

In the example shown in FIG. 1, one of the modules, the one indicated with number 2, is provided with an indentation 16 starting from the free edge which defines an opening through which the screws or nuts making up the jointing elements between the different lugs can be introduced when the modules 1 and 2 are coupled together. The opening for accessing the jointing elements could be located on the case, near the free edge of the module. Furthermore, the two modules can have a peripheral stepping 17 starting from the free end sections, which defines a peripheral seating when said modules are coupled where a strip closing the aerodynamic surface and defining a structurally secondary cuff is arranged. The jointing of this cuff 18 to the modules is carried out by means of countersunk screws 19, FIGS. 2 and 4, to which end a flat bar 20 containing the coupling nuts 21 is assembled in each one of the modules at the internal surface thereof and starting from its free edge. Thus, when the jointing is carried out in the field, the operator must simply position the cuff 18 and introduce the screws 19 from the outside, without needing to hold the nuts 21.

Figure 7:
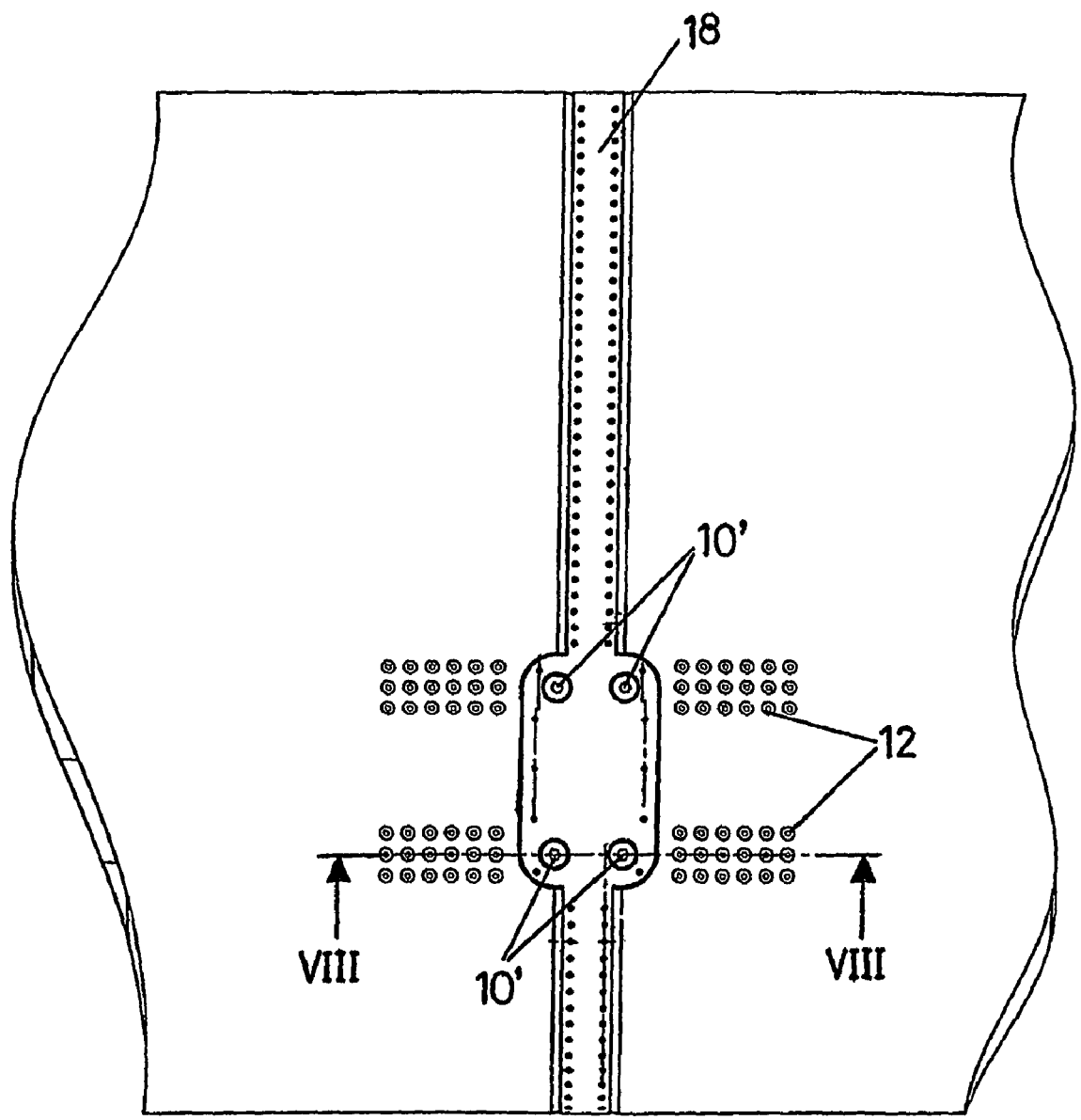
FIG. 7 shows a view similar to FIG. 2, corresponding to the embodiment variant of FIG. 6.
Figure 8:
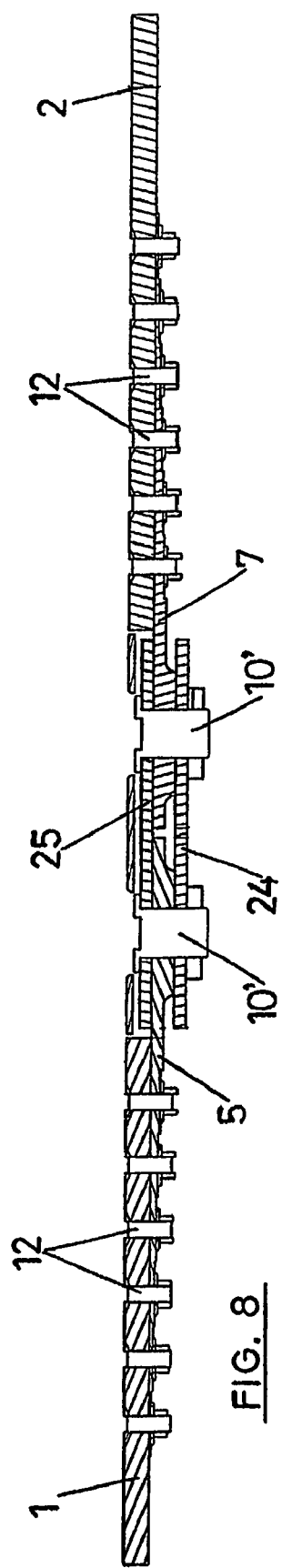
FIG. 8 shows a view similar to FIG. 3, but taken along VIII-VIII section line of FIG. 7.

In the embodiment shown in FIG. 6, the lugs 5 and 7 have a shorter length, such that when the modules 1 and 2 are abutted, said lugs do not overlap, the holes 9 of facing lugs being spaced a certain distance from one another. In this case, the jointing is carried out by means of intermediate plates 23 and 24, the first of which is placed outside and the second one inside, these plates being sized in order to be coupled on the facing lugs 5 and 7, lugs which in this case have an equal constitution, of a flat configuration. The plates 23 and 24 are provided with holes 25 and 26 which face the holes 9 of the lugs 5 and 7, respectively, to receive the attachment screws or bolts 10', as can be seen in FIGS. 7 and 8. This system will allow reducing the cost of the female lugs 7 of FIG. 1, which is a high cost because it is manufactured by machining. In the embodiment of FIG. 6, there are no male and female lugs, since the lugs 5 and 7 have an equal configuration. As indicated, the jointing between the intermediate plates 23 and 24 to the lugs is also carried out by means of bolts or pins. Even though in this case it seems that the number of points of attachment is doubled, this is not so in reality, since the jointing of the intermediate plates to several modules can be carried out in the factory.

Otherwise, the embodiment of FIG. 6, with regard to the fixing of the lugs 5, 6, 7 and 8, as well as the arrangement of the strip 18 forming the cuff, coincide with that described in relation to FIG. 1.

Figure 9:
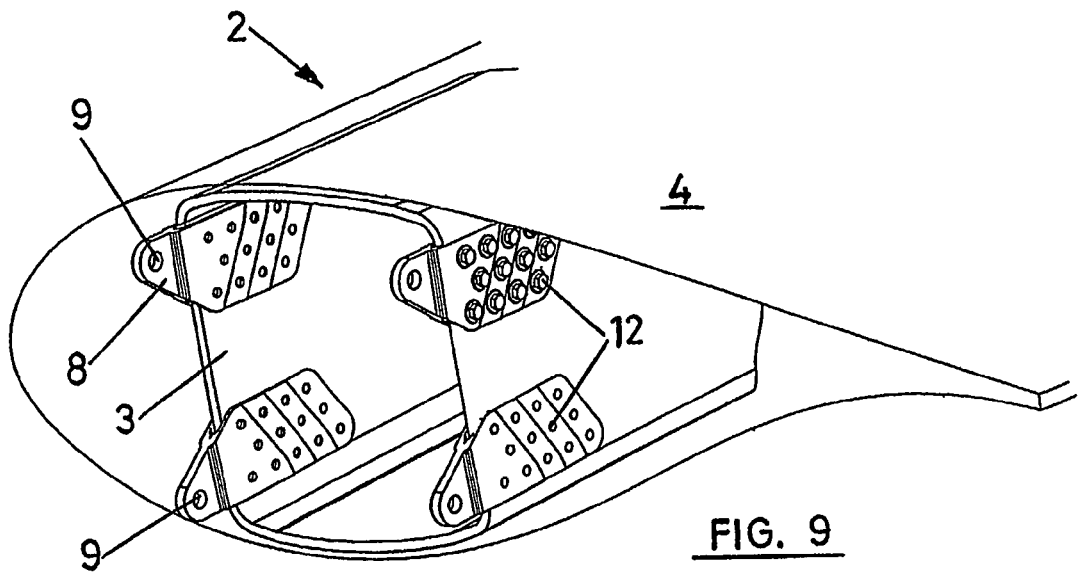
FIG. 9 shows a schematic perspective view of the end section of one of the modules, with a different lug arrangement than that shown in FIG. 1.

If it is desired to prevent joints close to the aerodynamic surface, four lugs can be placed in the spans of the structural beam 3 running between the shells or cases 4, as indicated with reference 8 in FIG. 9. Two other lugs, one on each side, not shown in the drawing, will be arranged in coincidence with the coinciding spans of the structural beam 3 and the cases 4.

Figure 10:
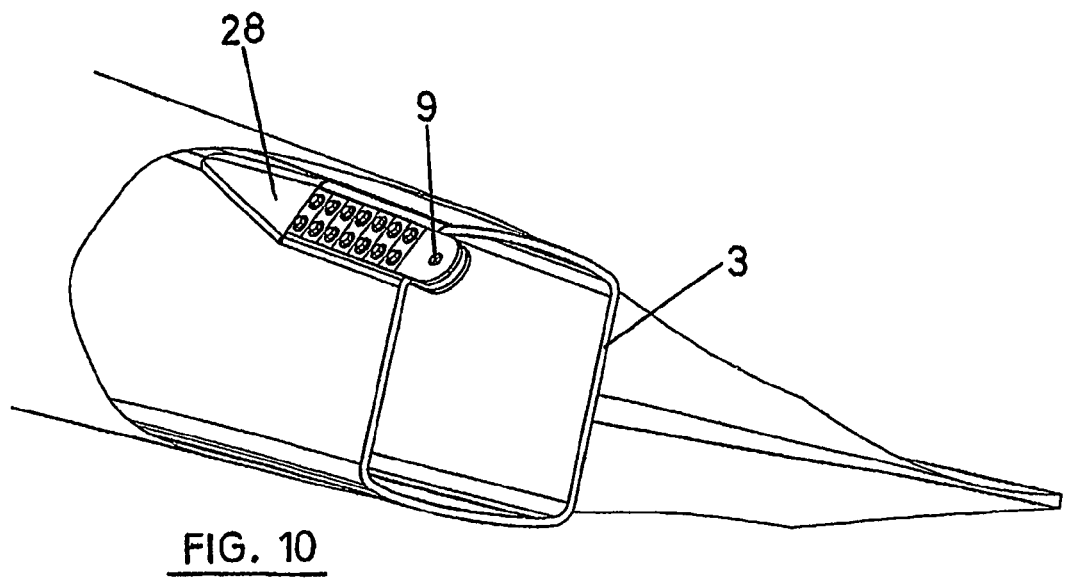
FIG. 10 shows a view similar to FIG. 9, showing an embodiment variant in the arrangement of the lugs.

In the case of FIGS. 1 and 6, as well as in the case of FIG. 9, it is necessary to arrange lugs in the spans of the structural beam 3 coinciding with the cases 4, as well as in the spans of the structural beam 3 running between said cases, due to the parallelism between lugs, incapable of absorbing all the components of the joint loads. However, by slightly modifying the geometry of the beam 3 such that the lugs 8 are not parallel, the jointing system can be resolved with just four points which are shown in FIG. 10. In this case, only four lugs 28 are arranged, only one of which is shown in the drawing. These four lugs are not parallel to any of the axes of the end section of the modules, being able to use a system of lugs similar to lugs 6, 8 of FIG. 1, with the same system for anchoring or attaching to the beams, by means of non-countersunk screws, since they do not affect the aerodynamic surface.

In the embodiment of FIG. 6, the two modules 1 and 2 are provided with indentations 16 starting from the edge of the end sections, which define an opening on which the plates 23 and 24 are coupled when said modules are abutted, said plates being provided with a central opening 29, facing in both plates, for the introduction of the attachment screws and coupling nuts.

The invention claimed is:

1. A wind turbine blade, transversely subdivided into two or more independent modules (1-2) which comprise external aerodynamic walls or cases (4) and an internal longitudinal reinforcement structure, said modules are on their end sections provided with connecting means constituted of lugs (5-7, 6-8) fixed to the internal longitudinal reinforcement structure and are provided with a hole (9) for receiving jointing elements, characterised in that said lugs axially project from the end sections, in coinciding position, approximately parallel to the axis of the modules, for receiving said joint elements consisting of an attachment screw or bolt perpendicular to the axis of the module, which screws or bolts work sheared way through the holes of each pair of facing lugs.

2. A blade according to claim 1, characterised in that the lugs (5-7, 6-8) of the faceable sections of the consecutive modules are transversally displaced in its end portion at a distance approximately equal to the thickness of said lugs, in such a way that when two consecutive modules are abutted, the facing lugs overlap with the holes being aligned to receive an attachment screw or bolt.

3. A blade according to claim 1, characterised in that the lugs (5-7) of the adjacent sections of the consecutive modules placed in coincidence with the wall or case do not project from the edge of said shell and are arranged in such a way that the facing lugs are located on a single plane, with the holes (9) being spaced at a certain distance from one another, the jointing elements being constituted of intermediate plates (23-24) which are placed on each pair of facing lugs (5) and are provided with holes (26-27) which can be aligned with those said lugs to receive attachment screws or bolts (10').

4. A blade according to claim 1, characterized in that the walls or cases and the internal longitudinal reinforcement structure are provided with faceable indentations (16) starting from the free edge, in coinciding spans, which define access openings through which the jointing elements between facing lugs are arranged when consecutive modules are abutted.

5. A blade according to claim 1, characterised in that the faceable edges of consecutive modules have an external peripheral indentation (17) on the wall or case which defines a peripheral seating when said modules are abutted and joined, in which a strip or cuff (18) is arranged closing the aerodynamic surface and fixed to the bottom of both indentations by means of screws (19).

6. A blade according to claim 5, characterized in that said modules are provided with a flat bar (20) fixed on its internal surface, starting from the sections or end sections, which flat bar bears nuts (21) for screwing in the screws (19) for fixing the strip or cuff.

7. A blade according to claim 1, characterised in that the lugs are abutted against the internal surface of the modules, starting from the free edge or edges thereof, and are joined to said modules by means of screws (12).

* * * * *